United States Patent
Wang et al.

(10) Patent No.: US 11,709,123 B2
(45) Date of Patent: Jul. 25, 2023

(54) METHOD FOR ANALYZING NUCLEATED RED BLOOD CELLS, BLOOD CELL ANALYZER, AND STORAGE MEDIUM

(71) Applicant: Shenzhen Mindray Bio-Medical Electronics Co., Ltd., Shenzhen (CN)

(72) Inventors: Guanzhen Wang, Shenzhen (CN); Bo Ye, Shenzhen (CN); Huan Qi, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 264 days.

(21) Appl. No.: 17/353,406

(22) Filed: Jun. 21, 2021

(65) Prior Publication Data
US 2021/0318223 A1    Oct. 14, 2021

Related U.S. Application Data

(63) Continuation of application No. PCT/CN2018/125002, filed on Dec. 28, 2018.

(51) Int. Cl.
*G01N 21/64* (2006.01)
*G01N 15/14* (2006.01)
*G01N 15/00* (2006.01)

(52) U.S. Cl.
CPC ............. *G01N 15/14* (2013.01); *G01N 21/64* (2013.01); *G01N 2015/0069* (2013.01); *G01N 2015/0073* (2013.01); *G01N 2015/1481* (2013.01)

(58) Field of Classification Search
CPC .................. G01N 15/14; G01N 21/64; G01N 2015/0069; G01N 2015/0073; G01N 2015/1481; G01N 2015/0076; G01N 2015/008; G01N 2015/0084; G01N 2015/1006; G01N 2015/1402; G01N 2015/1486; G01N 15/1459; G01N 15/1429
See application file for complete search history.

(56) References Cited

U.S. PATENT DOCUMENTS

| | | |
|---|---|---|
| 6,004,816 A | 12/1999 | Mizukami et al. |
| 2008/0180653 A1* | 7/2008 | Narisada ................ G01N 15/12 356/36 |
| 2017/0074863 A1* | 3/2017 | Masuda .................... G01N 1/38 |

FOREIGN PATENT DOCUMENTS

| | | |
|---|---|---|
| CN | 101086473 A | 12/2007 |
| CN | 101097181 A | 1/2008 |
| CN | 101750476 A | 6/2010 |
| CN | 101846671 A | 9/2010 |
| CN | 103492875 A | 1/2014 |
| CN | 103975054 A | 8/2014 |
| WO | WO 2016106688 A1 | 7/2016 |

* cited by examiner

*Primary Examiner* — Abdullahi Nur
(74) *Attorney, Agent, or Firm* — Kory D. Christensen

(57) ABSTRACT

A method for analyzing nucleated red blood cells in a blood sample includes obtaining fluorescence signals and scattered light signals of cells in a blood sample; classifying and counting ghost particles, white blood cells, and nucleated red blood cells in the blood sample according to the fluorescence signals and the scattered light signals; obtaining a characteristic value of a characteristic particle population related to the nucleated red blood cells; and ascertaining a final nucleated red blood cell detection result according to the classifying and counting result of the nucleated red blood cells and the characteristic value of the characteristic particle group.

20 Claims, 9 Drawing Sheets

METHOD FOR ANALYZING NUCLEATED RED BLOOD CELLS, BLOOD CELL ANALYZER, AND STORAGE MEDIUM

CROSS-REFERENCE TO RELATED APPLICATIONS

This application is a continuation of International Application No. PCT/CN2018/125002, filed Dec. 28, 2018, the content of which is incorporated herein by reference.

TECHNICAL FIELD

The disclosure relates to the field of medical apparatuses, and in particular to a method for analyzing nucleated red blood cells in a blood sample, a blood cell analyzer for performing the method, and a storage medium.

BACKGROUND

A blood cell analyzer is an instrument for detecting and analyzing components in a blood sample and can classify and count white blood cells (WBCs), red blood cells (RBCs), platelets (PLTs), nucleated red blood cells (NRBCs), reticulocytes (RETs), and other hemocytes.

Normally, nucleated red blood cells are present in bone marrow and thus will not appear in peripheral blood of a normal person. Nucleated red blood cells appear in peripheral blood or venous blood due to immature bone marrow erythroid cells being released into the peripheral blood, and their appearance in peripheral blood is closely related to blood diseases. Therefore, the identification and counting of nucleated red blood cells in blood is very important for the diagnosis of blood diseases.

Nucleated red blood cells are extremely abnormal cells. As noted in the book, *Clinical Laboratory Base* (3rd Edition): "in normal cases, a small amount of nucleated red blood cells can be seen in blood slides of infants within 1 week. However, for adults, nucleated red blood cells are all present in their bone marrow, and if they are seen in a peripheral blood smear slide, this is a phenomenon of a case. The case condition includes hemolytic anemia, malignant hematopoietic system disorders or bone marrow metastatic tumors, chronic myeloproliferative diseases, and post-splenectomy." In other words, there should be no NRBCs in adult peripheral blood, i.e., NRBC % should be 0. However, during the identification and counting of nucleated red blood cells in a blood sample, sample abnormalities (such as smear cells) and abnormal interference (such as desultory particles) may cause false positives of NRBC. If the ratio of nucleated red blood cells is too low, this will easily cause false negatives of NRBC, because, when the ratio of nucleated red blood cells is too low, it is difficult for a blood analyzer to determine whether the nucleated red blood cells obtained through classification are interfering desultory particles. Both NRBC false positives and false negatives may cause difficulties in clinical decision-making, thereby delaying the diagnosis and treatment of patients.

Accordingly, the detection of NRBCs with a low-count value is challenged, that is, higher requirements are presented for the detection sensitivity of NRBCs with a low-count value.

SUMMARY

The object of the disclosure is to provide a method for analyzing nucleated red blood cells in a blood sample, a blood cell analyzer, an analysis device and a computer-readable storage medium. The disclosure makes it possible to more accurately detect whether nucleated red blood cells are present in a blood sample, and particularly to improve the detection sensitivity of nucleated red blood cells with a low-count value, thereby greatly reducing the false positive rate and the false negative rate of detection results of nucleated red blood cells.

In order to achieve the object, a first aspect of the disclosure relates to a method for analyzing nucleated red blood cells in a blood sample, the method including the following steps: acquiring fluorescence signals and scattered light signals of cells in a blood sample, wherein the scattered light signals may include at least one kind of forward-scattered light signals and side-scattered light signals, and preferably, the scattered light signals may include forward-scattered light signals and side-scattered light signals; classifying and counting ghost particles, white blood cells and nucleated red blood cells in the blood sample according to the fluorescence signals and the scattered light signals; acquiring a characteristic value of a characteristic particle population related to the nucleated red blood cells, particularly acquiring a characteristic value of a characteristic particle population related to the nucleated red blood cells from the ghost particles; and ascertaining a final detection result of the nucleated red blood cells according to the classifying and counting result of the nucleated red blood cells and the characteristic value of the characteristic particle population.

In a further embodiment, the step of ascertaining a final detection result of the nucleated red blood cells according to the classifying and counting result of the nucleated red blood cells and the characteristic value of the characteristic particle population may include: determining whether the classifying and counting result of the nucleated red blood cells is within a preset range; determining whether the characteristic value of the characteristic particle population is greater than a predetermined threshold value when the classifying and counting result of the nucleated red blood cells is within the preset range, and determining that nucleated red blood cells are present in the blood sample when the characteristic value of the characteristic particle population is greater than the predetermined threshold value; and ascertaining the final detection result of the nucleated red blood cells according to the classifying and counting result of the nucleated red blood cells and the determination result of whether nucleated red blood cells are present in the blood sample.

In a further embodiment, the step of ascertaining a final detection result of the nucleated red blood cells according to the classifying and counting result of the nucleated red blood cells and the determination result may include: ascertaining the classifying and counting result of the nucleated red blood cells as the final detection result of the nucleated red blood cells when the classifying and counting result of the nucleated red blood cells is consistent with the determination result; and ascertaining the determination result as the final detection result of the nucleated red blood cells or retesting the blood sample, and/or providing an alarm for indicating that the classifying and counting result of the nucleated red blood cells is false, and/or providing a prompt for the presence of interference from desultory particles, when the classifying and counting result of the nucleated red blood cells is inconsistent with the determination result.

In a further embodiment, the step of ascertaining a final detection result of the nucleated red blood cells according to the classifying and counting result of the nucleated red blood cells and the characteristic value of the characteristic particle population may further comprise: ascertaining the classifying and counting result of the nucleated red blood cells as the final detection result of the nucleated red blood cells when the classifying and counting result of the nucleated red blood cells is outside the preset range.

In a further embodiment, the step of acquiring a characteristic value of a characteristic particle population related to the nucleated red blood cells may include: obtaining a statistical histogram of the fluorescence signals of the ghost particles; and obtaining, according to the statistical histogram, a peak value that is related to the nucleated red blood cells and appears in a low fluorescence signal value region of the ghost particles, wherein the peak value is the characteristic value of the characteristic particle population.

Alternatively, the step of acquiring a characteristic value of a characteristic particle population related to the nucleated red blood cells may include: generating a fluorescence-scattered light scattergram based on the fluorescence signals and the scattered light signals; and counting the characteristic particle population related to the nucleated red blood cells in a low fluorescence signal value region of the ghost particles in the fluorescence-scattered light scattergram, wherein the characteristic value of the characteristic particle population is the count of the characteristic particle population or a ratio of the count of the characteristic particle population to a total number of the ghost particles.

In a further embodiment, the method may further include: outputting the classifying and counting result of the nucleated red blood cells, the determination result and the final detection result of the nucleated red blood cells.

A second aspect of the disclosure relates to a blood cell analyzer including: a sampling device configured to suction a blood sample; a pretreatment device configured to pre-treat the blood sample to obtain a pre-treated blood sample; an optical detection device configured to allow cells in the pre-treated blood sample to pass through a detection area one by one, so as to detect fluorescence signals and scattered light signals of the cells in the blood sample; and a processor configured to perform the following steps: acquiring fluorescence signals and scattered light signals of cells from a blood sample, wherein the scattered light signals may include at least one kind of forward-scattered light signals and side-scattered light signals, and preferably, the scattered light signals may include forward-scattered light signals and side-scattered light signals; classifying and counting ghost particles, white blood cells and nucleated red blood cells in the blood sample according to the fluorescence signals and the scattered light signals; acquiring a characteristic value of a characteristic particle population related to the nucleated red blood cells, particularly acquiring a characteristic value of a characteristic particle population related to the nucleated red blood cells from the ghost particles; and ascertaining a final detection result of the nucleated red blood cells according to the classifying and counting result of the nucleated red blood cells and the characteristic value of the characteristic particle population.

In a further embodiment, the processor may be configured to perform the following steps when performing the step of ascertaining a final detection result of the nucleated red blood cells according to the classifying and counting result of the nucleated red blood cells and the characteristic value of the characteristic particle population: determining whether the classifying and counting result of the nucleated red blood cells is within a preset range; determining whether the characteristic value of the characteristic particle population is greater than a predetermined threshold value when the classifying and counting result of the nucleated red blood cells is within the preset range, and determining that nucleated red blood cells are present in the blood sample when the characteristic value of the characteristic particle population is greater than the predetermined threshold value; and ascertaining the final detection result of the nucleated red blood cells according to the classifying and counting result of the nucleated red blood cells and the determination result of whether nucleated red blood cells are present in the blood sample.

In a further embodiment, the processor may be further configured to perform the following steps when performing the step of ascertaining a final detection result of the nucleated red blood cells according to the classifying and counting result of the nucleated red blood cells and the determination result: ascertaining the classifying and counting result of the nucleated red blood cells as the final detection result of the nucleated red blood cells when the classifying and counting result of the nucleated red blood cells is consistent with the determination result; and ascertaining the determination result as the final detection result of the nucleated red blood cells or retesting the blood sample when the classifying and counting result of the nucleated red blood cells is inconsistent with the determination result.

In a further embodiment, the processor may be further configured to perform the step of providing an alarm for indicating that the classifying and counting result of the nucleated red blood cells is false, and/or providing a prompt for the presence of interference from desultory particles when the classifying and counting result of the nucleated red blood cells is inconsistent with the determination result.

In a further embodiment, the processor may be further configured to perform the following steps when performing the step of ascertaining a final detection result of the nucleated red blood cells according to the classifying and counting result of the nucleated red blood cells and the characteristic value of the characteristic particle population: ascertaining the classifying and counting result of the nucleated red blood cells as the final detection result of the nucleated red blood cells when the classifying and counting result of the nucleated red blood cells is outside the preset range.

In a further embodiment, the processor may be further configured to perform the following steps when performing the step of acquiring a characteristic value of a characteristic particle population related to the nucleated red blood cells: obtaining a statistical histogram of the fluorescence signals of the ghost particles; and obtaining, according to the statistical histogram, a peak value that is related to the nucleated red blood cells and appears in a low fluorescence signal value region of the ghost particles, wherein the peak value is the characteristic value of the characteristic particle population.

Alternatively, the processor may be further configured to perform the following steps when performing the step of acquiring a characteristic value of a characteristic particle population related to the nucleated red blood cells: generating a fluorescence-scattered light scattergram based on the fluorescence signals and the scattered light signals; and counting the characteristic particle population related to nucleated red blood cells in the low fluorescence signal value region of the ghost particles in the fluorescence-scattered light scattergram, wherein the characteristic value of the characteristic particle population is the count of the characteristic particle population or a ratio of the count of the characteristic particle population to the total number of the ghost particles.

In a further embodiment, the blood cell analyzer may also include a display configured to display the classifying and counting result of the nucleated red blood cells, the determination result and the final detection result of the nucleated red blood cells, which are output by the processor.

In addition, a third aspect of the disclosure relates to an analysis device for analyzing nucleated red blood cells in a blood sample, the analysis device including a memory, a processor, and a computer program stored in the memory and executable on the processor, wherein when the processor executes the computer program, the steps of the method according to the first aspect of the disclosure are implemented.

Additionally, a fourth aspect of the disclosure relates to a computer-readable storage medium storing executable instructions, wherein the computer-readable storage medium is configured to implement, when a processor is caused to execute the executable instructions, the steps of the method according to the first aspect of the disclosure.

Based on the method and device disclosed in the disclosure, the nucleated red blood cells that have been classified are reconfirmed such that the nucleated red blood cells in the blood sample can be detected more accurately, and particularly, the detection sensitivity of nucleated red blood cells with a low-count value can be effectively improved.

DETAILED DESCRIPTION

Figure 1:
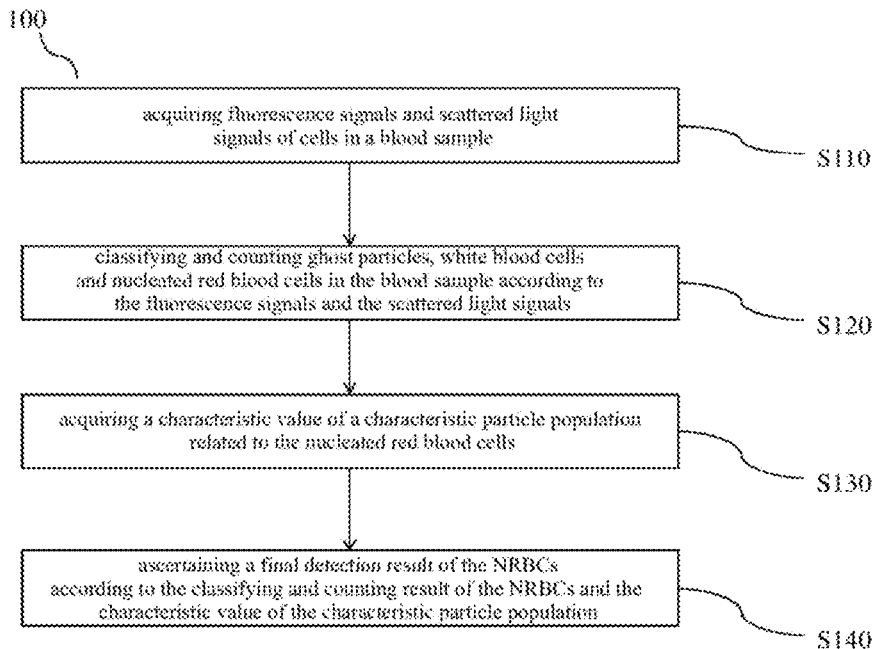
FIG. 1 is a schematic flowchart of a first embodiment of a method for analyzing nucleated red blood cells in a blood sample according to the disclosure.

The disclosure will be exemplarily explained in detail below by way of embodiments with reference to the accompanying drawings. These embodiments should not be restrictive to the disclosure, but are used to better understand the disclosure.

It can be appreciated by those skilled in the art that singular forms "a", "an", "the" and "this" used herein may also include plural forms unless expressly stated. It should be further appreciated that the word "include" used in the description of the present application means the presence of described characteristics, integers, steps, operations, elements and/or components, but does not exclude the presence or addition of one or more other characteristics, integers, steps, operations, elements, components and/or groups thereof. It should be appreciated that when an element is referred to as being "connected" to another element, it may be directly connected to another element, or an intermediate element may be present. In addition, "connection" used herein may include wireless connection. The words "and/or" used herein include all or any unit of, and all combinations of, one or more associated listed items.

It can be appreciated by those skilled in the art that unless otherwise defined, all terms (including technical terms and scientific terms) used herein have the same meanings as those generally understood by those of ordinary skill in the art to which the present application belongs. It should also be appreciated that terms such as those defined in a general dictionary should be understood to have meanings consistent with those in the context of the prior art, and will not be interpreted in idealized or overly formal meanings unless specifically defined as here.

In order to facilitate the subsequent description, some terms involved in the following are briefly explained as follows herein.

1) A "Scattergram" is a two-dimensional or three-dimensional diagram generated by a blood cell analyzer, with two-dimensional or three-dimensional characteristic information about a plurality of particles distributed thereon, wherein an X coordinate axis, a Y coordinate axis and a Z coordinate axis of the scattergram each represent a characteristic of each particle. For example, in a scattergram, the X coordinate axis represents a forward-scattered light intensity, the Y coordinate axis represents a fluorescence intensity, and the Z coordinate axis represents a side-scattered light intensity.

2) A "Cell Population" is distributed in a certain region of a scattergram, and is a particle group formed by a plurality of particles having identical characteristics, for example, a white blood cell population, and a neutrophil granulocyte population, a lymphocyte population, a monocyte population, an eosinophil granulocyte population or a basophil granulocyte population of white blood cells.

3) A "Ghost" represents fragmented particles obtained by hemolyzing red blood cells and platelets in blood with a hemolytic agent.

Currently, a blood cell analyzer generally counts and classifies white blood cells through a DIFF channel, a BASO channel and/or an NRBC channel. The blood cell analyzer performs four-classification of white blood cells in the DIFF channel, and classifies white blood cells into four types of white blood cells: lymphocytes (Lym), monocytes (Mon), neutrophil granulocytes (Neu), and eosinophil granulocytes (Eos). The blood cell analyzer provides a count value of basophil granulocytes and a count value of WBCs in the BASO channel, and obtains, through a combination of the BASO channel and the DIFF channel, results of five-classification of white blood cells, including five types of white blood cells: lymphocytes (Lym), monocytes (Mon), neutrophil granulocytes (Neu), eosinophil granulocytes (Eos), and basophil granulocytes (Baso). The blood cell analyzer classifies nucleated red blood cells in the NRBC channel. The NRBC channel can provide a count value of white blood cells, a count value of the nucleated red blood cells, and a count value of basophil granulocytes.

The principle of classifying and counting blood cells by the blood cell analyzer in the NRBC channel is as follows: a laser irradiates blood cells in a flow cell to generate detection signals for detecting the blood cells. The detection signals generally include three kinds of optical signals, namely, forward-scattered light signals (FSC), side-scattered light signals (SSC) and fluorescence signals (FL), which can be combined with each other to obtain various scattergrams. By using the scattergrams obtained from the fluorescence signals and the forward-scattered light signals and/or the side-scattered light signals, the classification of WBC, NRBC, and BASO can be realized.

It should be noted here that the method according to the disclosure is implemented in the NRBC channel or a WNB channel (a combination of the BASO channel and the NRBC channel). This method can assist in determining whether nucleated red blood cells are present in a blood sample, thereby improving the detection sensitivity of nucleated red blood cells with a low-count value, greatly reducing false positives and false negatives of nucleated red blood cells, and improving the accuracy of detection results of the nucleated red blood cells, particularly the accuracy of detection results of nucleated red blood cells with a low-count value.

The core idea of the disclosure is that: a characteristic particle population related to nucleated red blood cells has been discovered to be present in ghost particles in the NRBC or WNB channel. The applicant has found, through statistical analysis of a large amount of data and clinical research, that when flow cytometry is used to analyze, in the NRBC channel or the WNB channel, a scattergram obtained based on fluorescence signals and scattered light signals (forward-scattered light signals and/or side-scattered light signals) of blood samples treated by reagents and containing nucleated red blood cells, a particle population was stably clustered in a specific region of the ghost. After research, it is confirmed that the particle population was strongly correlated to the appearance of nucleated red blood cells, and the particle population is referred to as an NRBC characteristic particle population herein. In a two-dimensional or three-dimensional scattergram generated from fluorescence signals and scattered light signals (forward-scattered light signals and/or side-scattered light signals), an NRBC characteristic particle population stably appears in a low fluorescence signal value region of a ghost particle region, that is, appears in a left region of the ghost particle region.

Although not wishing to be bound by theory, through analysis of the function principle of the reagents, the applicant believes that, the reason why a particle population is always clustered in a specific region of the ghost in a sample with nucleated red blood cells is as follows: due to body's compensatory release or release dysfunction, nucleated red blood cells often appear in peripheral blood of patients with severe diseases such as hemolytic anemia, malignant tumors, leukemia, myelofibrosis, severe hypoxia, and bone marrow metastatic tumors. The red blood cell system in the peripheral blood of the patients usually has a certain degree of abnormalities, such as cell membrane mutation. These abnormalities will show anti-hemolysis performance when the reagents act, and therefore, weak forward-scattered light signals and side-scattered light signals will be generated. In addition, because certain components inside red blood cells such as cytochrome and riboflavin may be non-specifically bound with a fluorescent dye, weak fluorescence signals will also be generated by the components. In this way, scattered dots generated by these abnormal red blood cells via a flow cytometer will appear in a specific region of a fluorescence-scattered light (forward-scattered light and/or side-scattered light) scattergram, and thus it can be determined whether nucleated red blood cells are present in a blood sample by detecting whether a NRBC characteristic particle population in ghost particles appears in a specific region of the fluorescence-scattered light scattergram.

Referring first to FIG. 1, FIG. 1 is a schematic flowchart of a first embodiment of a method 100 for analyzing nucleated red blood cells in a blood sample according to the disclosure. The method 100 is applied to a blood cell analyzer, particularly a flow cytometer, and includes the following steps.

Step S110: acquiring fluorescence signals and scattered light signals of cells in a blood sample, wherein the scattered light signals include at least one kind of forward-scattered light signals and side-scattered light signals, preferably, include forward-scattered light signals and side-scattered light signals.

Before the cells in the blood sample pass through a detection area of the blood cell analyzer, the cells in the blood sample are subjected to a hemolysis treatment and fluorescence staining treatment. Specifically, the blood sample is mixed with a reagent having a fluorescent dye and a hemolytic agent at a certain ratio so as to form a treated blood sample. The hemolytic agent is used to hemolyze red blood cells in the blood sample, such that the red blood cells do not have interference with the counting of white blood cells and nucleated red blood cells. In addition, the fluorescent dye is bound with nucleic acids in the white blood cells and the nucleated red blood cells to label the cells, and various types of cells differ in the ability of being bound with the fluorescent dye, different fluorescence information will thus be produced. Moreover, different forward-scattered light information will be produced due to different sizes of various types of cells, and different side-scattered light information will be produced due to different morphologies or degrees of complexity in cells. The flow cytometer is used to allow the cells to pass through the detection area one by one, so as to acquire a fluorescence signal and a scattered light signal of each cell.

Step S120: classifying and counting ghost particles, white blood cells and nucleated red blood cells according to the fluorescence signals and the scattered light signals, particularly the forward-scattered light signals.

Step S130: acquiring a characteristic value of a characteristic particle population related to the nucleated red blood cells, particularly acquiring a characteristic value of a characteristic particle population related to the nucleated red blood cells from the ghost particles.

Preferably, step S130 specifically includes: acquiring, from a low fluorescence signal value region of the ghost particles, the characteristic value of the characteristic particle population related to the nucleated red blood cells. It can be understood that the position and size of the low fluorescence signal value region of the ghost particles may be fixed, that is, preset, or may be dynamically changed based on the position of the ghost particles according to certain rules. When the position and size of the low fluorescence signal value region of the ghost particles may be fixed, for example, the low fluorescence signal value region can be obtained in the following manner, namely: in the same detection system, a normal blood sample that does not contain nucleated red blood cells and an abnormal blood sample that is known to contain nucleated red blood cells are respectively measured to obtain fluorescence signal statistical histograms or fluorescence-scattered light scattergrams of the two blood samples. By comparison, a region, in which the characteristic particle population appears in the fluorescence signal statistical histogram or fluorescence-scattered light scattergram of the abnormal blood sample, while in which no characteristic particle population appears in the fluorescence signal statistical histogram or fluorescence-scattered light scattergram of the normal blood sample, is found in the left of the ghost particle region. Therefore, the region may be determined as the low fluorescence signal value region of the ghost particles.

Step S140: ascertaining a final detection result of the nucleated red blood cells according to the classifying and counting result of the nucleated red blood cells and the characteristic value of the characteristic particle population.

Figure 2:
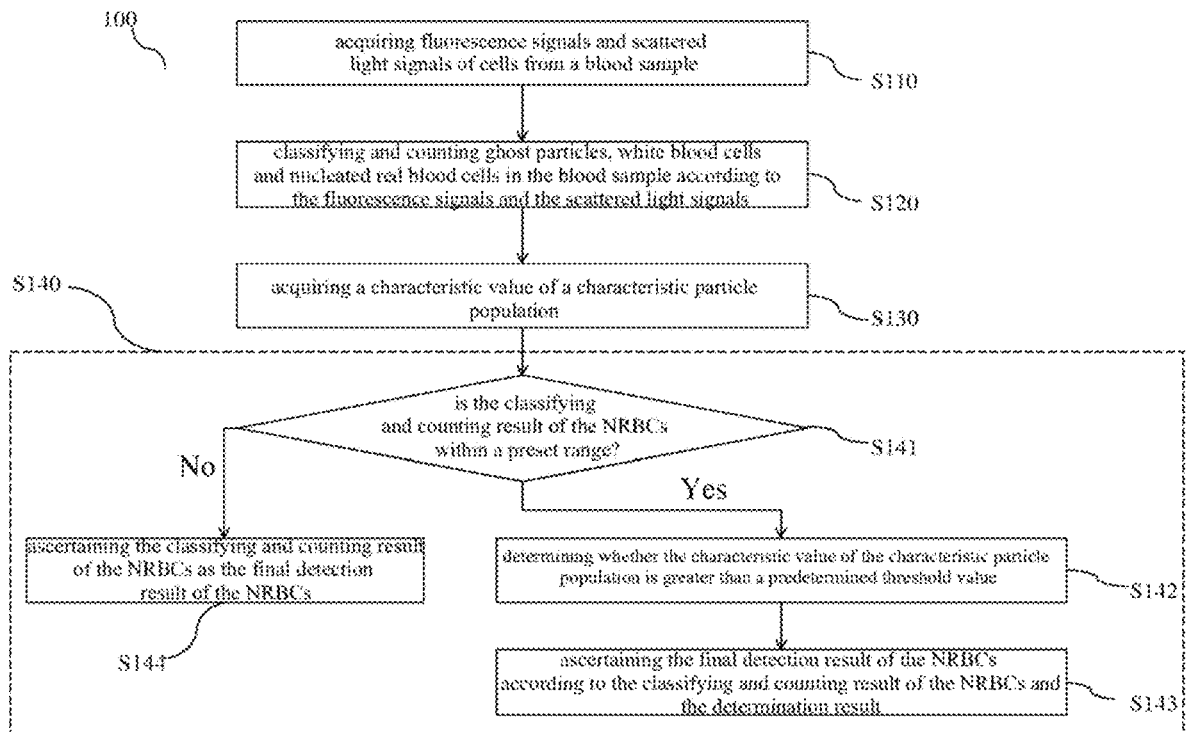
FIG. 2 is a schematic flowchart of a second embodiment of a method for analyzing nucleated red blood cells in a blood sample according to the disclosure.

Specifically, as shown in FIG. 2, FIG. 2 is a schematic flowchart of a second embodiment of a method 100 for analyzing nucleated red blood cells in a blood sample according to the disclosure, in which step S140 may include:

step S141: determining whether the classifying and counting result of the nucleated red blood cells is within a preset range;

step S142: determining whether the characteristic value of the characteristic particle population is greater than a predetermined threshold value when the classifying and counting result of the nucleated red blood cells is within the preset range, and determining that nucleated red blood cells are present in the blood sample when the characteristic value of the characteristic particle population is greater than the predetermined threshold value; and step S143: ascertaining the final detection result of the nucleated red blood cells according to the classifying and counting result of the nucleated red blood cells and the determination result of whether nucleated red blood cells are present in the blood sample.

Here, the classifying and counting result of the nucleated red blood cells can be given in a form of the number of nucleated red blood cells per 100 white blood cells, that is, NRBC % (unit:/100 WBCs), and in this case, the preset range may be 0-3.

Preferably, the predetermined threshold value is set according to the type of the characteristic value of the characteristic particle population, that is: when different types of characteristic values of characteristic particle populations are selected to determine whether nucleated red blood cells are present in the blood sample, the corresponding predetermined threshold values are also different.

It can be understood that the predetermined threshold value may be an empirical value obtained according to experimental statistics, or may be adjusted according to actual conditions.

In a specific implementation, step S142 includes:

step S142a: ascertaining the classifying and counting result of the nucleated red blood cells as the final detection result of the nucleated red blood cells when the classifying and counting result of the nucleated red blood cells is consistent with the determination result; and step S142b: ascertaining the determination result as the final detection result of the nucleated red blood cells or retesting the blood sample when the classifying and counting result of the nucleated red blood cells is inconsistent with the determination result. For example, a user may manually choose to or set the blood cell analyzer to automatically choose to ascertain the determination result as the final detection result of the nucleated red blood cells or to retest the blood sample.

Further, step S142 may further include step S142c: providing an alarm for indicating that the classifying and counting result of the nucleated red blood cells is false, and/or providing a prompt for the presence of interference from desultory particles when the classifying and counting result of the nucleated red blood cells is inconsistent with the determination result. Here, for example, an alarm for indicating that the classifying and counting result of the nucleated red blood cells is false is provided by means of text, sound, light, or a pop-up window, etc., to give the user a prompt that the detection result of the nucleated red blood cells in the blood sample may be wrong. For example, when the classifying and counting result of the nucleated red blood cells is positive, whereas the determination result is negative, a further prompt may be provided for the user that there may be desultory particles in the blood sample that interfere with the counting of the nucleated red blood cells.

Further, as shown in FIG. 2, step S140 may further include:

S144: ascertaining the classifying and counting result of the nucleated red blood cells as the final detection result of the nucleated red blood cells when the classifying and counting result of the nucleated red blood cells is outside the preset range. For example, when the classifying and counting result of nucleated red blood cells is zero or is greater than a certain larger limit value, the final detection result of the nucleated red blood cells is directly ascertained as zero. That is to say, only for detection results of nucleated red blood cells with a low-count value, that is, when the classifying and counting result of the nucleated red blood cells is within the preset range, the final detection result of the nucleated red blood cells is corrected according to the characteristic value of the characteristic particle population, thereby improving the detection sensitivity of nucleated red blood cells with a low-count value.

Preferably, the method may further include: outputting the classifying and counting result of the nucleated red blood cells, the determination result and the final detection result of the nucleated red blood cells, for example, outputting the same to a display of the blood cell analyzer.

In one advantageous implementation of the method according to the disclosure, step S130 may include:

S131a: obtaining a statistical histogram of the fluorescence signals of the ghost particles; and S131b: obtaining, according to the statistical histogram, a peak value that is related to the nucleated red blood cells and appears in a low fluorescence signal value region of the ghost particles, wherein the peak value is the characteristic value of the characteristic particle population.

Here, this implementation is referred to as a method for one-dimensional detection of NRBC characteristic particle population. Specifically, a statistical histogram of the fluorescence signals of the classified ghost particles is obtained, so as to detect whether a significant peak value appears in the low fluorescence signal value region of the ghost particles. If the peak value exceeds a set threshold value, it proves that nucleated red blood cells are present; and if the classifying and counting result of the nucleated red blood cells is positive in this case, it means that the positive result is credible, and therefore, the classifying and counting result of the nucleated red blood cells is ascertained as the final detection result of the nucleated red blood cells. If the peak value does not exceed the set threshold value, it means that no nucleated red blood cells are present; and if the classifying and counting result of the nucleated red blood cells is positive in this case, it is considered that the tested blood sample may be a false positive sample, and therefore, the classifying and counting result of the nucleated red blood cells may be set to zero, that is, the final detection result of the nucleated red blood cells is ascertained to be negative. Of course, alternatively, the user may choose whether to retest the blood sample, or set the blood cell analyzer to retest the blood sample automatically. In addition, in this case, an alarm for indicating that the classifying and counting result of the nucleated red blood cells is false, and/or a prompt for the presence of interference from desultory particles may be provided by means of text, sound, light, or a pop-up window, etc.

FIGS. 3A to 3D are respectively statistical histograms of fluorescence signals of different blood samples.

Figure 3A:
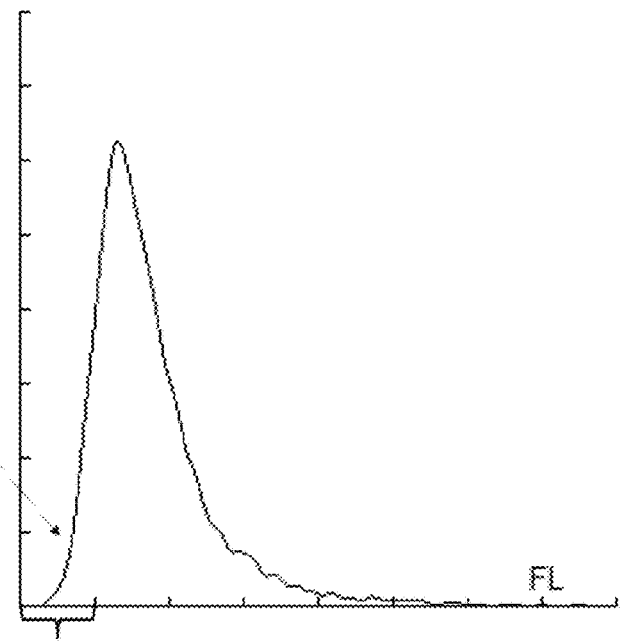
FIG. 3A is a statistical histogram of fluorescence signals of ghost particles in a normal blood sample.

FIG. 3A is a statistical histogram of fluorescence signals of a normal blood sample. The microscopic examination result of nucleated red blood cells of the normal blood sample was NRBC %=0 (unit:/100 WBCs), and the classifying and counting result of the nucleated red blood cells obtained by the blood cell analyzer according to the fluorescence signals and scattered light signals of the cells in the blood sample is also NRBC %=0. It can be seen from FIG. 3A that there is no peak representing the NRBC characteristic particle population in the low fluorescence signal value region of the ghost particles, which confirms that the blood sample is a normal negative sample.

Figure 3B:
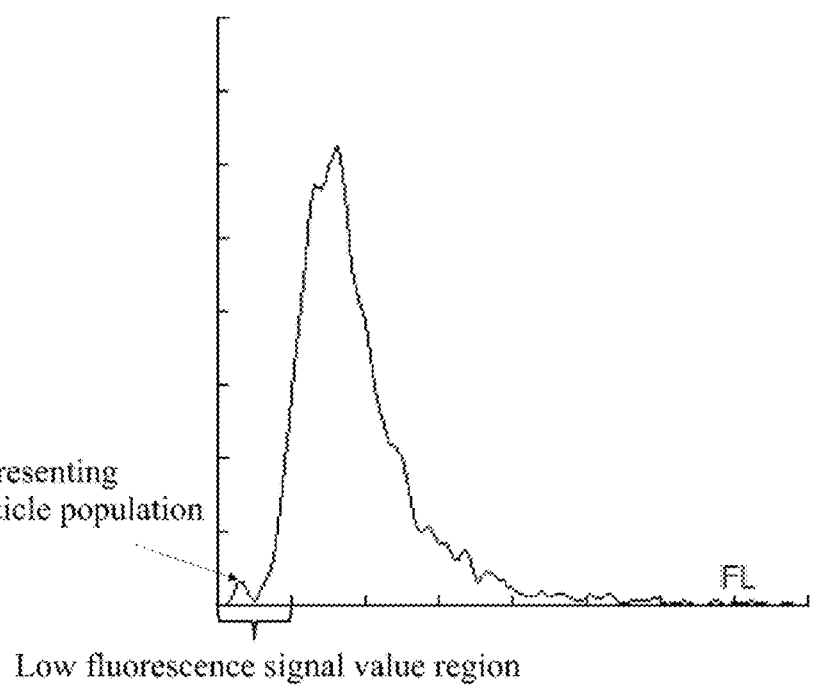
FIG. 3B is a statistical histogram of fluorescence signals of ghost particles in a blood sample with a low-count value of NRBCs.

FIG. 3B is a statistical histogram of fluorescence signals of a blood sample with a low-count value of NRBCs. The microscopic examination result of the blood sample with a low-count value of NRBCs was NRBC %=0.3, and the classifying and counting result of the nucleated red blood cells obtained by the blood cell analyzer according to the fluorescence signals and scattered light signals of the cells in the blood sample was NRBC %=0.23. It can be seen from FIG. 3B that there is a peak representing a NRBC characteristic particle population in the low fluorescence signal value region of the ghost particles, which confirms that the blood sample with a low-count value of NRBCs is a positive sample and the NRBC detection result obtained from the blood cell analyzer is credible, and therefore, the final NRBC detection result is NRBC %=0.23.

Figure 3C:
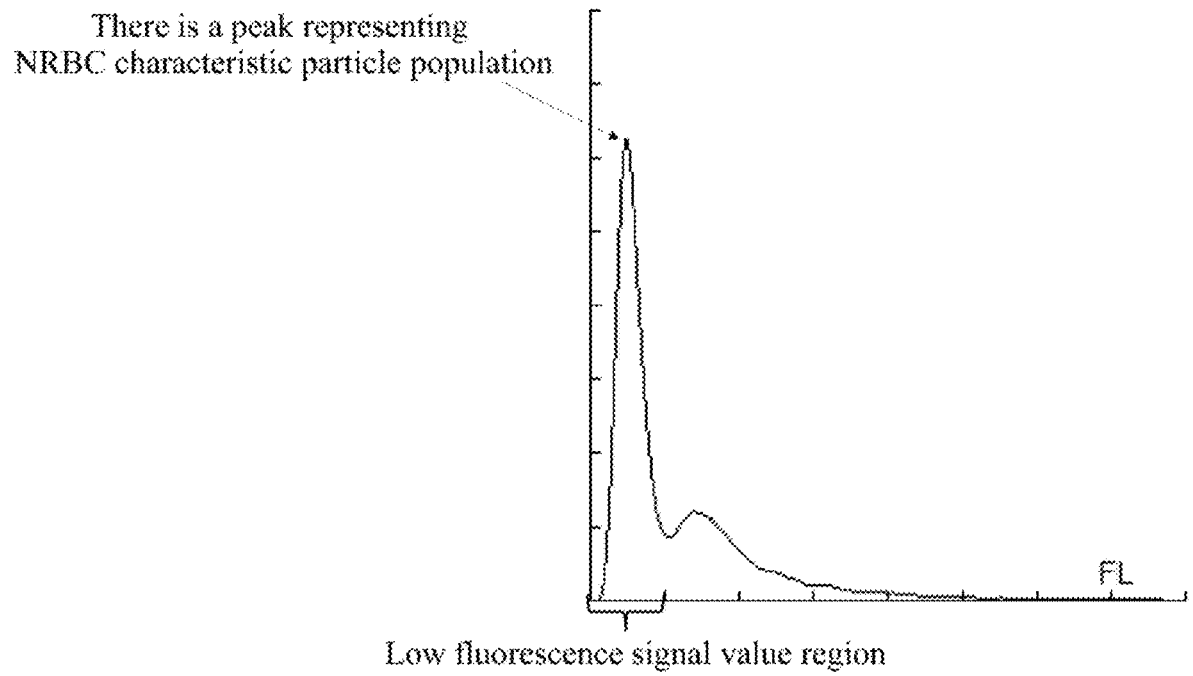
FIG. 3C is a statistical histogram of fluorescence signals of ghost particles in a blood sample with a high-count value of NRBCs.

FIG. 3C is a statistical histogram of fluorescence signals of a blood sample with a high-count value of NRBCs. The microscopic examination result of the blood sample with a high-count value of NRBCs was NRBC %=30 (unit:/100 WBCs), and the classifying and counting result of the nucleated red blood cells obtained by the blood cell analyzer according to the fluorescence signals and scattered light signals of the cells in the blood sample was NRBC %=28.46. It can be seen from FIG. 3C that there is a peak representing a NRBC characteristic particle population in the low fluorescence signal value region of the ghost particles, which confirms that the blood sample with a high-count value of NRBCs is a positive sample and the NRBC detection result obtained from the blood cell analyzer is credible, and therefore, the final NRBC detection result is NRBC %=28.46.

Figure 3D:
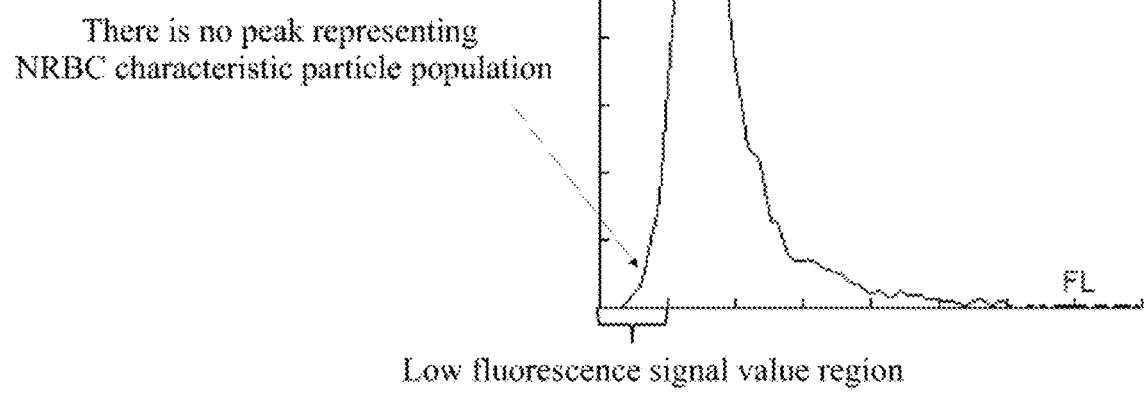
FIG. 3D is a statistical histogram of fluorescence signals of ghost particles in a blood sample where there are desultory particles that interfere with NRBC detection.

FIG. 3D is a statistical histogram of fluorescence signals of a blood sample where there are desultory particles that interfere with NRBC detection. Similar to the one-dimensional fluorescence signal statistical histogram of the normal blood sample, the microscopic examination result of nucleated red blood cells of this interferent-containing sample was NRBC %=0, and the classifying and counting result of the nucleated red blood cells obtained by the blood cell analyzer according to the fluorescence signals and scattered light signals of the cells in the blood sample were NRBC %=0.2. However, it can be seen from FIG. 3D that there is no peak representing a NRBC characteristic particle population in the low fluorescence signal region of the ghost particles, which indicates that the blood sample may be a negative sample. That is to say, there may be interference from desultory particles in the blood sample. However, the blood cell analyzer cannot accurately identify the interference from desultory particles according to conventional classification methods, but may regard the interfering desultory particles as nucleated red blood cells, thus leading to a wrong detection result. After applying the method of the disclosure, the blood cell analyzer in this case ascertains the NRBC result obtained according to the characteristic value of the NRBC characteristic particle population as the final detection result of the nucleated red blood cells, that is to say, the final detection result of the nucleated red blood cells obtained in this embodiment is NRBC %=0, which is the same as the microscopic examination result.

It can be seen therefrom that, the disclosure can particularly distinguish the blood sample with a low-count value of NRBCs from the blood sample where there is interference from desultory particles, so as to prevent false positive and false negative results from occurring as much as possible.

In one alternative implementation of the method according to the disclosure, step S130 may also include:

S132a: generating a two-dimensional fluorescence-scattered light scattergram based on the fluorescence signals and the forward-scattered light signals or the side-scattered light; and S132b: counting the characteristic particle population related to the nucleated red blood cells in a low fluorescence signal value region of the ghost particles in the two-dimensional fluorescence-scattered light scattergram, wherein the characteristic value of the characteristic particle population is the count of the characteristic particle population or a ratio of the count of the characteristic particle population to a total number of the ghost particles.

Here, this implementation is referred to as a method for two-dimensional detection of NRBC characteristic particle population. Specifically, among the ghost particles that have been classified, for example, a clustering method is applied to identify a particle population in the low value region of the fluorescence-forward scattered light signals, namely identify the NRBC characteristic particle population, and then it is determined whether nucleated red blood cells are present according to the number of particles in the particle population or the ratio of the number of particles in the particle population to the total number of the ghost particles. If the number of particles in the particle population or the ratio of the number of particles in the particle population to the total number of the ghost particles exceeds a set threshold value, it proves that nucleated red blood cells are present; and if the classifying and counting result of the nucleated red blood cells are positive in this case, it proves that the positive result is credible, and therefore, the classifying and counting result of the nucleated red blood cells is ascertained as the final detection result of the nucleated red blood cells. If the number of particles in the particle population or the ratio of the number of particles in the particle population to the total number of ghost particles does not exceed the set threshold value, it means that no nucleated red blood cells are present; and if the classifying and counting result of the nucleated red blood cells is positive in this case, it is considered that the tested blood sample may be a false positive sample, and therefore, the classifying and counting result of the nucleated red blood cells may be set to zero, that is, the final detection result of the nucleated red blood cells is ascertained to be negative. Of course, alternatively, the user may choose whether to retest the blood sample, or set the blood cell analyzer to retest the blood sample automatically. Further, an alarm for indicating that the classifying and counting result of the nucleated red blood cells is false, and/or a prompt for the presence of interference from desultory particles may be provided. In this embodiment, if the number of particles in the NRBC characteristic particle population is selected as the characteristic value, the threshold value may be selected as 50, for example. If the ratio of the number of particles in the NRBC characteristic particle population to the total number of the ghost particles is selected as the characteristic value, the threshold value may be selected as 5%, for example.

FIGS. 4A to 4E are respectively two-dimensional fluorescence-scattered light scattergrams of different blood samples.

Figure 4A:
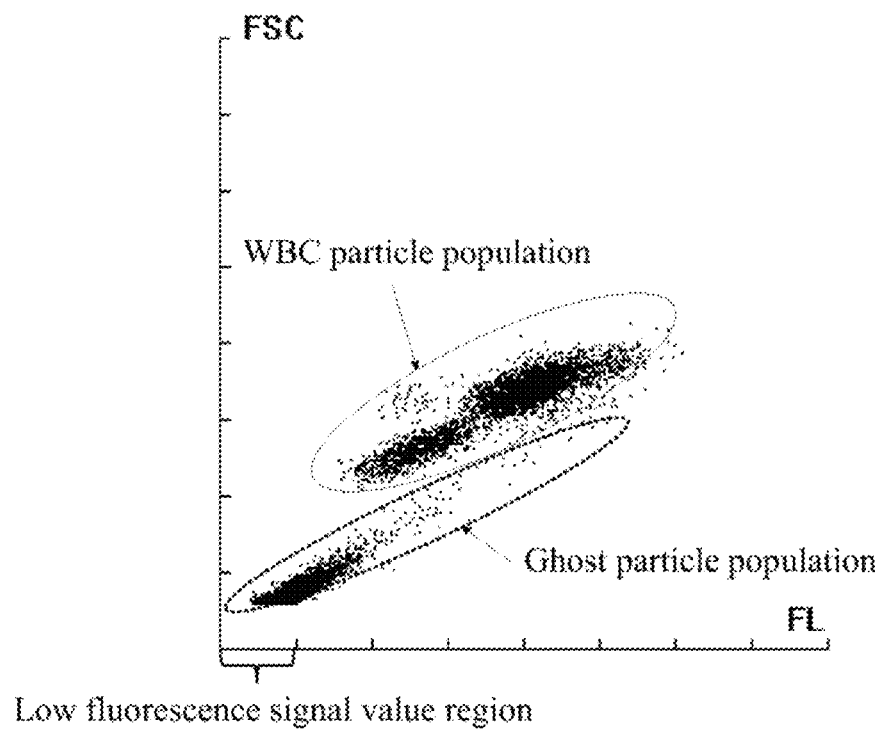
FIG. 4A is a two-dimensional fluorescence-forward scattered light scattergram of the same normal blood sample as in FIG. 3A.

FIG. 4A shows a two-dimensional fluorescence-forward scattered light scattergram of the same normal blood sample as in FIG. 3A. The microscopic examination result of the nucleated red blood cells of the normal blood sample was NRBC %=0, and the classifying and counting result of the nucleated red blood cells obtained by the blood cell analyzer according to the fluorescence signals and scattered light signals of the cells in the blood sample was NRBC %=0. It can be seen from FIG. 4A that there is no NRBC characteristic particle population present in the low fluorescence signal value region of the ghost particles, which confirms that the blood sample is a normal negative sample.

Figure 4B:
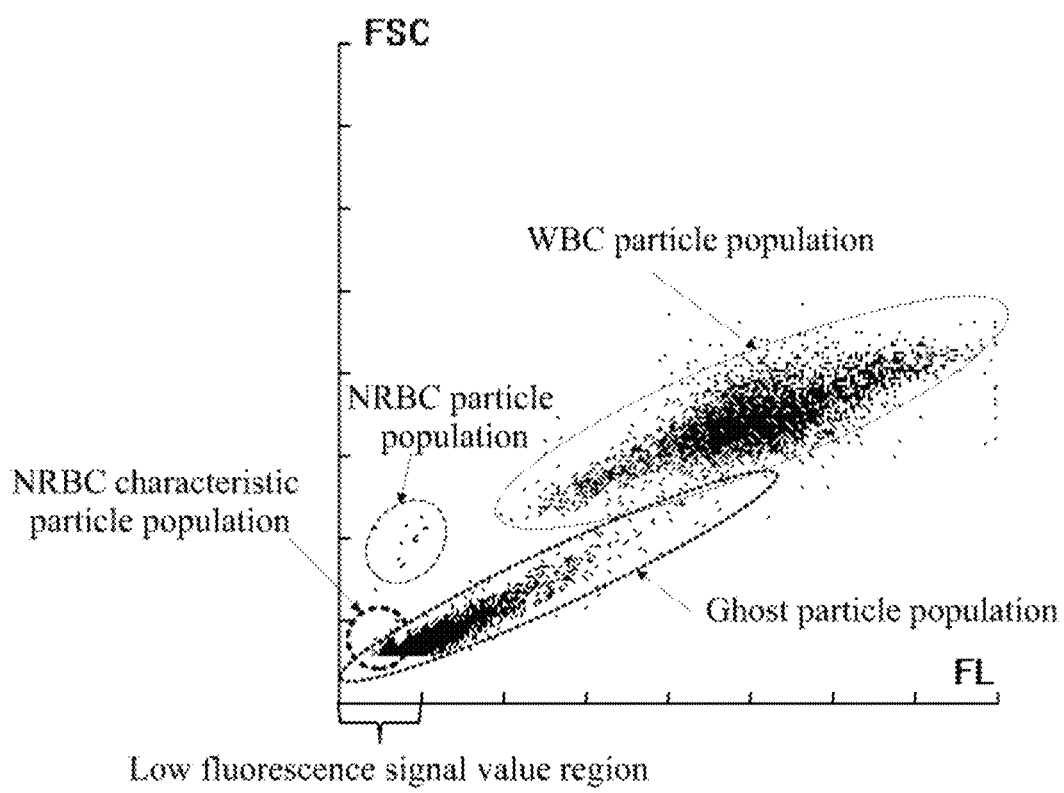
FIG. 4B is a two-dimensional fluorescence-forward scattered light scattergram of the same blood sample with a low-count value of NRBCs as in FIG. 3B.

FIG. 4B shows a two-dimensional fluorescence-forward scattered light scattergram of the same blood sample with a low-count value of NRBCs as in FIG. 3B. The microscopic examination result of the blood sample with a low-count value of NRBCs was NRBC %=0.3, and the classifying and counting result of the nucleated red blood cells obtained by the blood cell analyzer according to the fluorescence signals and scattered light signals of the cells in the blood sample was NRBC %=0.23. In this embodiment, there were a total of 4438 ghost particles. It can be seen from FIG. 4B that a significant NRBC characteristic particle population is clustered in the low fluorescence signal value region of the ghost particles. There were 577 particles in the NRBC characteristic particle population, accounting for 13% of the total number of the ghost particles, which exceeds the predetermined threshold value of 5%, thereby confirming that the blood sample with a low-count value of NRBCs is a positive sample and the NRBC detection result obtained from the blood cell analyzer is credible, and therefore, the final NRBC detection result is NRBC %=0.23.

Figure 4C:
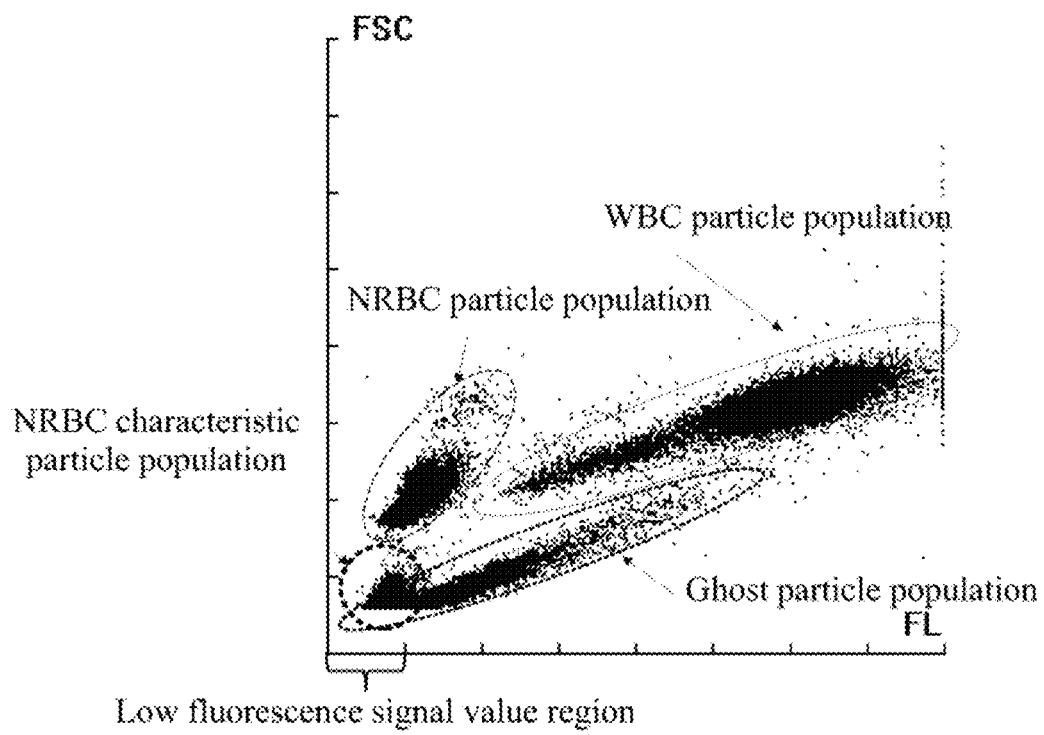
FIG. 4C is a two-dimensional fluorescence-forward scattered light scattergram of the same blood sample with a high-count value of NRBCs as in FIG. 3C.
Figure 4D:
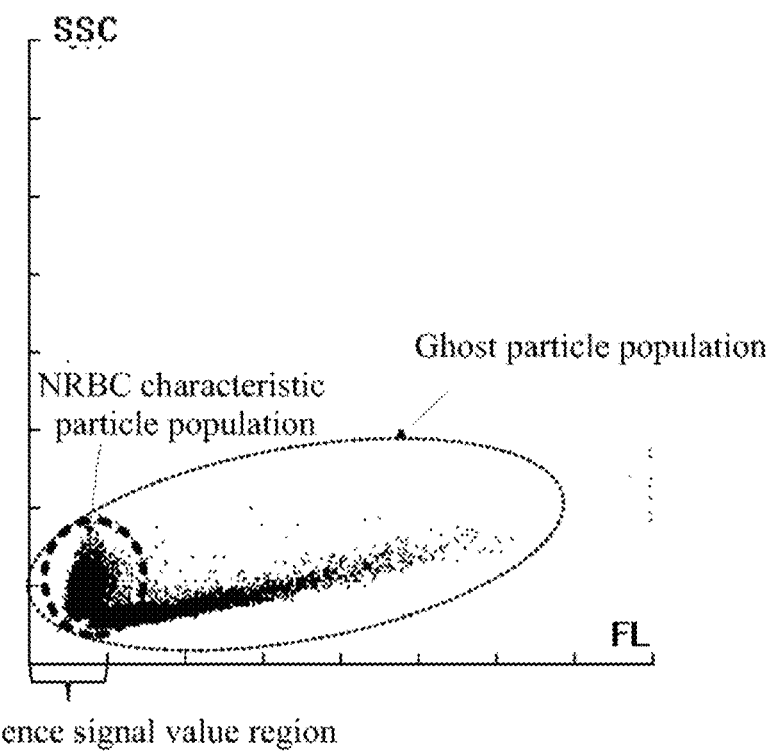
FIG. 4D is a two-dimensional fluorescence-side scattered light scattergram of the same blood sample with a high-count value of NRBCs as in FIG. 3C.

FIGS. 4C and 4D are respectively a two-dimensional fluorescence-forward scattered light scattergram and a two-dimensional fluorescence-side scattered light scattergram of the same blood sample with a high-count value of NRBCs as in FIG. 3C. The microscopic examination result of the blood sample with a high-count value of NRBCs was NRBC %=30, and the classifying and counting result of the nucleated red blood cells obtained by the blood cell analyzer according to the fluorescence signals and scattered light signals of the cells in the blood sample was NRBC %=28.46. In this embodiment, there were a total of 27028 ghost particles. It can be seen from FIG. 4C that a significant NRBC characteristic particle population is clustered in the region with low fluorescence signals and low forward-scattered light signals of the ghost particles. There were 19190 particles in the NRBC characteristic particle population, accounting for 71% of the total number of the ghost particles, which exceeds the predetermined threshold value of 5%, confirming that the blood sample with a high-count value of NRBCs is a positive sample and the NRBC detection result obtained from the blood cell analyzer is credible, and therefore, the final NRBC detection result is NRBC %=28.46. In the same way, it can also be seen from FIG. 4D that a significant NRBC characteristic particle population is clustered in the low fluorescence signal value region of the ghost particles.

Figure 4E:
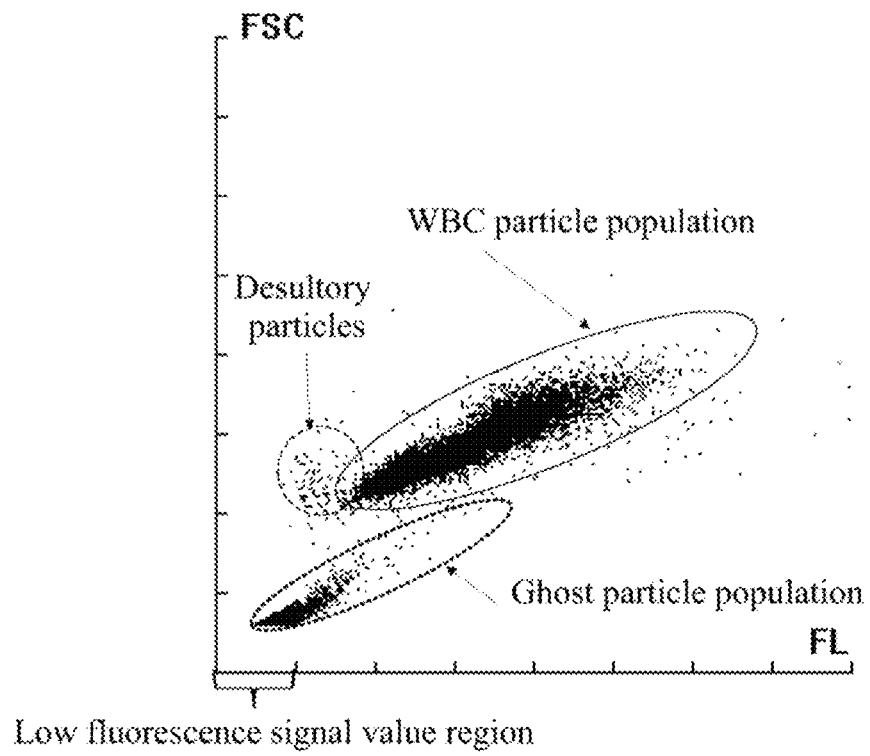
FIG. 4E is a two-dimensional fluorescence-forward scattered light scattergram of the same blood sample where there are desultory particles that interfere with NRBC detection as in FIG. 3D.
Figure 5A:
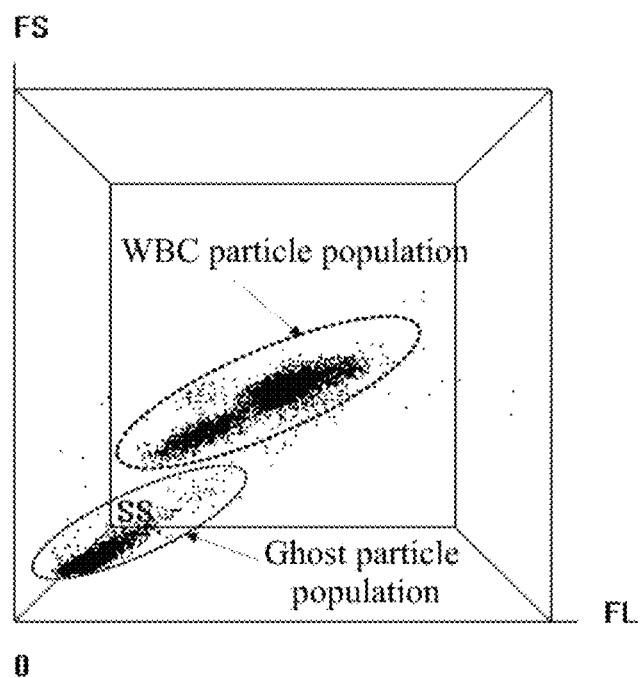
FIG. 5A is a three-dimensional fluorescence-forward scattered light-side scattered light scattergram of the same normal blood sample as in FIG. 3A.
Figure 5B:
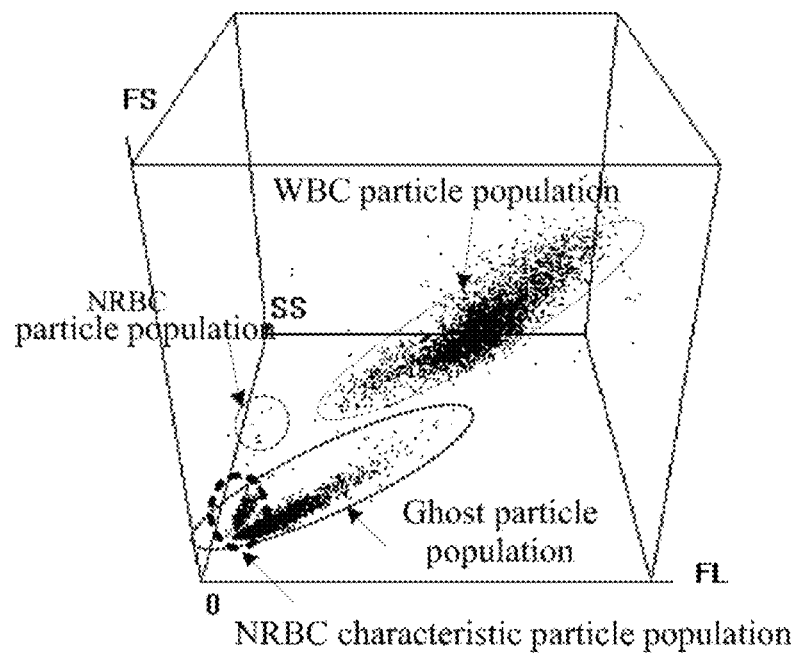
FIG. 5B is a three-dimensional fluorescence-forward scattered light-side scattered light scattergram of the same blood sample with a low-count value of NRBCs as in FIG. 3B.
Figure 5C:
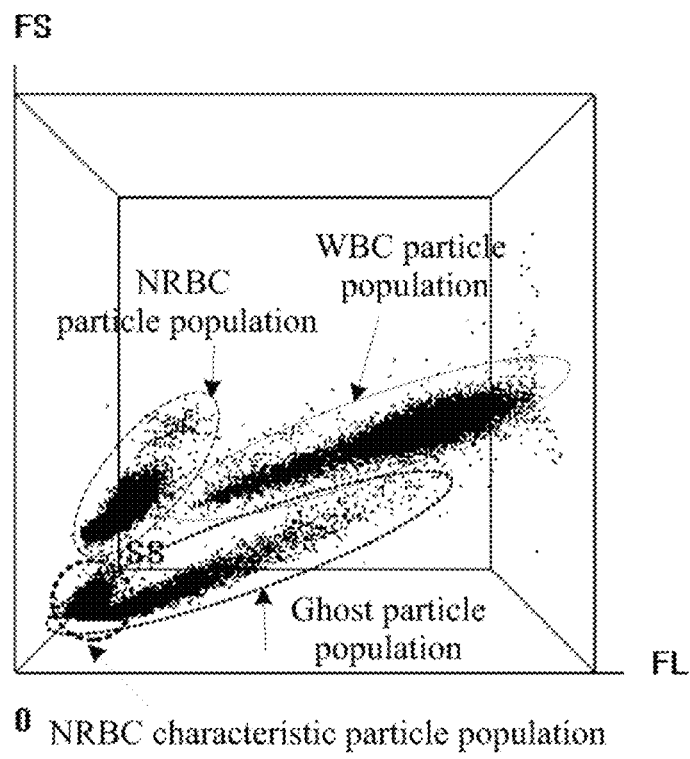
FIG. 5C is a three-dimensional fluorescence-forward scattered light-side scattered light scattergram of the same blood sample with a high-count value of NRBCs as in FIG. 3C.
Figure 5D:
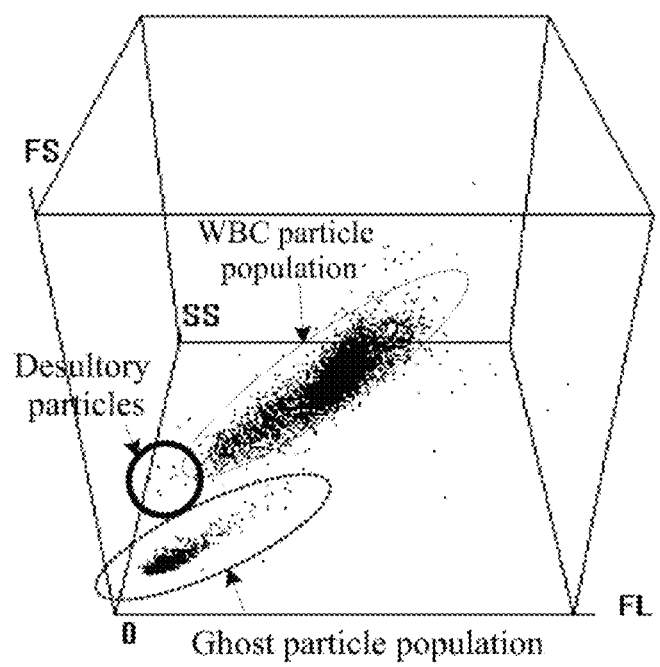
FIG. 5D is a three-dimensional fluorescence-forward scattered light-side scattered light scattergram of the same blood sample where there are desultory particles that interfere with NRBC detection as in FIG. 3D.

FIG. 4E is a two-dimensional fluorescence-forward scattered light scattergram of a blood sample where there are desultory particles that interfere with NRBC. The microscopic examination result of the nucleated red blood cells of the interferent-containing sample was NRBC %=0, and the classifying and counting result of the nucleated red blood cells obtained by the blood cell analyzer according to the fluorescence signals and scattered light signals of the cells in the blood sample was NRBC %=0.2. However, it can be seen from FIG. 4E that there is no NRBC characteristic particle population present in the low fluorescence signal value region of the ghost particles, which indicates that the blood sample may be negative, that is to say, the blood sample may contain interference from desultory particles. In this case, according to the disclosure, the blood cell analyzer will ascertain the NRBC result obtained according to the characteristic value of the NRBC characteristic particle population as the final detection result of the nucleated red blood cells, that is to say, in this embodiment, the final detection result of the nucleated red blood cells is negative, which is the same as the microscopic examination result.

In another alternative implementation of the method according to the disclosure, step S130 may also include:

S133a: generating a three-dimensional fluorescence-scattered light scattergram based on the fluorescence signals, the forward-scattered light signals and the side-scattered light; and S133b: counting the particle population related to the nucleated red blood cells in a low fluorescence signal value region of the ghost particles in the three-dimensional fluorescence-scattered light scattergram, wherein the characteristic value of the characteristic particle population is the count of the characteristic particle population or a ratio of the count of the characteristic particle population to the total number of the ghost particles.

Here, this implementation is referred to as a method for three-dimensional detection of NRBC characteristic particle population. The specific method for determining nucleated red blood cells is similar to the above two-dimensional detection method. FIGS. 5A to 5D are respectively three-dimensional fluorescence-scattered light scattergrams of the same blood samples as in FIGS. 3A to 3D. For specific analysis, reference is made to the description of FIGS. 4A to 4E.

In order to further verify the effect of the method for analyzing nucleated red blood cells according to the disclosure, the applicant collected 1438 blood samples for testing. The microscopic examination results of these blood samples were as below: there were 152 NRBC positive samples, and 1286 NRBC negative samples. By using a flow cytometer, the 1438 blood samples were analyzed respectively by using a conventional method and the method according to the disclosure, and the results obtained were as shown in Table 1 and Table 2.

TABLE 1

Detection results of nucleated red blood cells obtained by using the conventional method

| True positive | | True negative | | False positive | | False negative | |
|---|---|---|---|---|---|---|---|
| Number | Rate | Number | Rate | Number | Rate | Number | Rate |
| 144 | 94.7% | 1255 | 97.6% | 31 | 2.4% | 8 | 5.3% |

TABLE 2

Detection results of nucleated red blood cells obtained by using the method according to the disclosure

| True positive | | True negative | | False positive | | False negative | |
|---|---|---|---|---|---|---|---|
| Number | Rate | Number | Rate | Number | Rate | Number | Rate |
| 149 | 98.0% | 1282 | 99.7% | 4 | 0.3% | 3 | 2.0% |

The true positive rate, the true negative rate, the false positive rate and the false negative rate are calculated through the following formula:

true positive rate=number of true positives/(number of true positives+number of false negatives)*100% true negative rate=number of true negatives/(number of true negatives+number of false positives)*100% false positive rate=number of false positives/(number of true negatives+number of false positives)*100% false negative rate=number of false negatives/(number of true positives+number of false negatives)*100%.

It can be seen from Table 1 and Table 2 that compared with the conventional method for detecting nucleated red blood cells, the method according to the disclosure can greatly improve the accuracy of detection of nucleated red blood cells, in which the true positive rate was as high as 98% and the true negative rate was as high as 99.7%, while the false positive rate was only 0.3%, and the false negative rate was only 2.0%. Therefore, the method according to the disclosure can greatly reduce false positives and false negatives of nucleated red blood cells, and improve the accuracy of detection results of nucleated red blood cells, particularly the accuracy of detection results of nucleated red blood cells with a low-count value.

Figure 6:
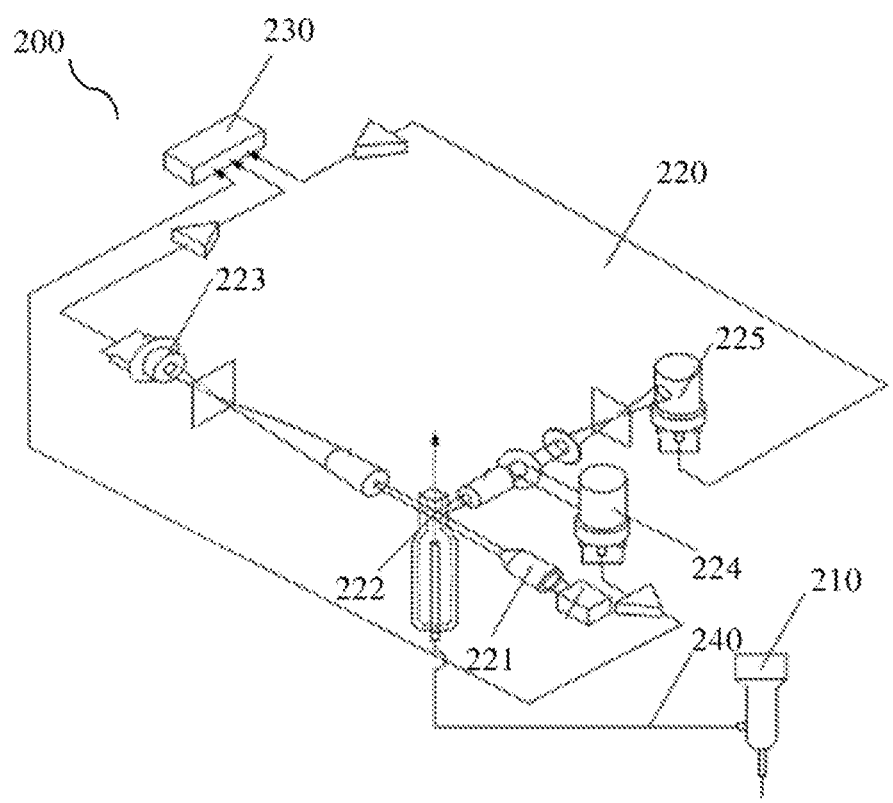
FIG. 6 is a schematic structural diagram of a blood cell analyzer according to the disclosure.

In addition, as shown in FIG. 6, further provided in the disclosure is a blood cell analyzer 200, which is particularly configured as a flow cytometer. The blood cell analyzer 200 includes: a sampling device (not shown) configured to suction a blood sample; a pretreatment device 210 configured to pretreat the blood sample so as to obtain a pre-treated blood sample, wherein the pretreatment includes a hemolysis treatment and a fluorescence staining treatment for cells in the blood sample; an optical detection device 220 configured to allow the cells in the pretreated blood sample to pass through a detection area one by one, so as to detect scattered light signals and fluorescence signals of the cells in the blood sample, wherein the scattered light signals include at least one kind of forward-scattered light signals and side-scattered light signals; and a processor 230 configured to perform the above method.

The optical detection device 220 may include, but is not limited to, a light source 221, a sheath flow cell 222 with an orifice, etc. Particles in the blood sample can flow in the sheath flow cell 222 and pass through the orifice one by one. Light emitted by the light source 221 can irradiate the particles in the orifice and scattered light signals and/or fluorescence signals are thus correspondingly generated. The optical detection device 220 may further include a flow cell 222 as the detection area, a forward-scattered light collecting portion 223 arranged on an optical axis, a side-scattered light collecting device portion 224 arranged on a side of the optical axis, and a fluorescence collecting portion 225. The cells of the blood sample treated by the pretreatment device 210 sequentially enter the flow cell 222 (detection area) through a pipe 240, wherein the forward-scattered light collecting portion 223, the side-scattered light collecting device portion 224 and the fluorescence collecting portion 225 sequentially detect and collect forward-scattered light information, side-scattered light information and fluorescence information of each cell in the same channel, and send the information to the processor 230.

The processor 230 may be implemented in a host and perform the following method steps:

acquiring the fluorescence signals and the scattered light signals of the cells in the blood sample, wherein the scattered light signals include at least one kind of forward-scattered light signals and side-scattered light signals, preferably, include forward-scattered light signals and side-scattered light signals;

acquiring a characteristic value of a characteristic particle population related to the nucleated red blood cells, particularly acquiring a characteristic value of a characteristic particle population related to the nucleated red blood cells from the ghost particles; and ascertaining a final detection result of the nucleated red blood cells according to the classifying and counting result of the nucleated red blood cells and the characteristic value of the characteristic particle population.

Specifically, the processor 230 is configured to perform the following steps when performing the step of ascertaining a final detection result of the nucleated red blood cells according to the classifying and counting result of the nucleated red blood cells and the characteristic value of the characteristic particle population:

determining whether the classifying and counting result of the nucleated red blood cells is within a preset range;

determining whether the characteristic value of the characteristic particle population is greater than a predetermined threshold value when the classifying and counting result of the nucleated red blood cells is within the preset range, and determining that nucleated red blood cells are present in the blood sample when the characteristic value of the characteristic particle population is greater than the predetermined threshold value; and ascertaining the final detection result of the nucleated red blood cells according to the classifying and counting result of the nucleated red blood cells and the determination result of whether nucleated red blood cells are present in the blood sample; for example, ascertaining the classifying and counting result of the nucleated red blood cells as the final detection result of the nucleated red blood cells when the classifying and counting result of the nucleated red blood cells is consistent with the determination result; and ascertaining the determination result as the final detection result of the nucleated red blood cells or retesting the blood sample, or providing an alarm for indicating that the classifying and counting result of the nucleated red blood cells is false, and/or providing a prompt for the presence of interference from desultory particles, when the classifying and counting result of the nucleated red blood cells is inconsistent with the determination result.

In addition, the processor 230 is further configured to perform the following steps when performing the step of ascertaining a final detection result of the nucleated red blood cells according to the classifying and counting result of the nucleated red blood cells and the characteristic value of the characteristic particle population:

ascertaining the classifying and counting result of the nucleated red blood cells as the final detection result of the nucleated red blood cells when the classifying and counting result of the nucleated red blood cells is outside the preset range.

In some preferred implementations, the processor 230 is further configured to perform the following steps when performing the step of acquiring a characteristic value of a characteristic particle population related to the nucleated red blood cells:

obtaining a statistical histogram of the fluorescence signals of the ghost particles; and obtaining, according to the statistical histogram, a peak value that is related to the nucleated red blood cells and appears in a low fluorescence signal value region of the ghost particles, wherein the peak value is the characteristic value of the characteristic particle population;

or the processor is configured to perform the following steps:

generating a fluorescence-scattered light scattergram based on the fluorescence signals and the scattered light signals; and counting the characteristic particle population related to the nucleated red blood cells in a low fluorescence signal value region of the ghost particles in the fluorescence-scattered light scattergram, wherein the characteristic value of the characteristic particle population is the count of the characteristic particle population or a ratio of the count of the characteristic particle population to the total number of the ghost particles.

In addition, the blood cell analyzer 200 may also comprise a display (not shown) configured to display the classifying and counting result of the nucleated red blood cells, the determination result and the final detection result of the nucleated red blood cells, which are output by the processor.

Reference may be made to the above description of the method of the disclosure for more details, which will not be repeated here.

Figure 7:
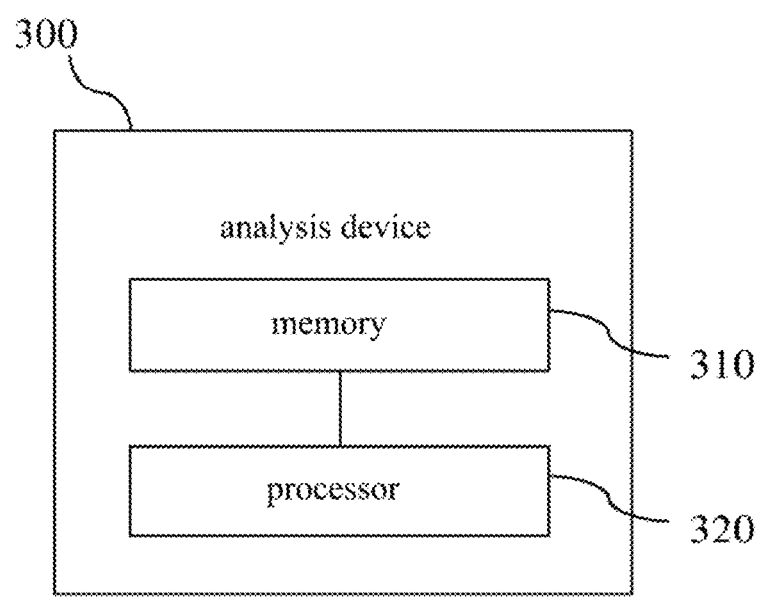
FIG. 7 is a schematic structural diagram of an analysis device for analyzing nucleated red blood cells in a blood sample according to the disclosure.

As shown in FIG. 7, further provided in the disclosure is a schematic structural diagram of an analysis device 300 for analyzing nucleated red blood cells in a blood sample. The analysis device 300 includes: a memory 310, a processor 320, and a computer program stored in the memory and executable on the processor. When the processor executes the computer program, the steps of the above method according to the disclosure are implemented.

For example, the computer program may be divided into one or more modules/units. The one or more modules/units are stored in the memory and are executed by the processor to complete the disclosure. The one or more modules/units may be a series of computer program instruction segments capable of completing specific functions, and the instruction segments are used to describe the process of execution of the computer program in device/terminal apparatus. For example, the computer program may be divided into a sample information acquisition unit, a classifying and counting unit and a result analysis unit. The specific functions of all the units are as follows: the sample information acquisition unit is configured to acquire fluorescence signals and scattered light signals of cells in a blood sample; the classifying and counting unit is configured to classify and count ghost particles, white blood cells and nucleated red blood cells in the blood sample according to the fluorescence signals and the scattered light signals; a characteristic value acquisition unit configured to acquire a characteristic value of a characteristic particle population related to the nucleated red blood cells; and the result analysis unit is configured to ascertain a final detection result of the nucleated red blood cells according to the classifying and counting result of the nucleated red blood cells and the characteristic value of the characteristic particle population.

Those skilled in the art can understand that FIG. 7 is merely an example of the analysis device 300, and does not constitute a limitation on the analysis device. The analysis device may include more or fewer components than those shown in FIG. 7, or a combination of certain components, or different components. For example, the analysis device 300 may further include an input and output apparatus, a network access apparatus, a bus, etc.

The processor may be a central processing unit (CPU) or may be other general-purpose processor, a digital signal processor (DSP), an application specific integrated circuit (ASIC), a field-programmable gate array (FPGA), or other programmable logic device, a discrete gate or transistor logic device, a discrete hardware component, etc. The general-purpose processor may be a microprocessor, or the processor may be any conventional processor or the like. The processor is a control center of the analysis device, and is connected to various parts of the entire analysis device by means of various interfaces and lines.

The memory may be configured to store the computer program and/or module. The processor runs or executes the computer program and/or module stored in the memory and invokes data stored in the memory to implement various functions of the analysis device. The memory may mainly include a program storage area and a data storage area, wherein the program storage area may store an operating system, an application program required for at least one function (for example, a sound playing function, an image playing function, etc.), etc.; and the data storage area may store data (for example, audio data, telephone book, etc.) created according to the use of a mobile phone, etc. In addition, the memory may include a high-speed random access memory (RAM), and may further include a non-volatile memory such as a hard disk, an internal memory, and a removable hard disk, a smart media card (SMC), a secure digital (SD) card, a flash card, at least one disk storage device, a flash memory device or another volatile solid-state storage device.

The analysis device, if implemented in the form of software functional units and sold or calibrated as an independent product, may be stored in a computer-readable storage medium. Based on such understandings, all or some procedures in the above embodiment methods implemented in the disclosure may also be accomplished by instructing related hardware through a computer program. The computer program may be stored in a computer-readable storage medium. When the computer program is executed by the processor, the steps of the above method according to the disclosure can be implemented. The computer program includes computer program codes, which may be in the form of source codes, object codes, an executable file or some intermediate forms, etc. The computer-readable medium may include: any entity or device capable of carrying the computer program codes, such as a recording medium, a USB flash drive, a mobile hard disk drive, a magnetic disk, a compact disk, a computer memory, a read-only memory (ROM), a RANI, an electrical carrier signal, a telecommunication signal and a software distribution medium. It should be noted that appropriate additions or deletions may be made to the content comprised in the computer-readable medium according to the requirements of the legislation in a jurisdictional area and patent practice. For example, in some jurisdictional areas, according to the legislation and patent practice, the computer-readable medium does not comprise an electrical carrier signal or a telecommunication signal.

The features mentioned above may be combined with each other arbitrarily as long as they are meaningful within the scope of the disclosure. The advantages and features described for the method are applicable to the blood cell analyzer and the analysis device in a corresponding manner.

Although specific implementations of the disclosure have been described above, those skilled in the art should understand that these specific implementations are merely examples for illustration. Various changes or modifications to these specific implementations may be made by those skilled in the art without departing from the principle of the disclosure; and these changes and modifications shall all fall within the protection scope of the disclosure.

What is claimed is:

1. A method for analyzing nucleated red blood cells in a blood sample, the method being applied to a blood cell analyzer and comprising the following steps:
    acquiring fluorescence signals and scattered light signals of cells in the blood sample;
    classifying and counting ghost particles, white blood cells and nucleated red blood cells in the blood sample according to the fluorescence signals and the scattered light signals;
    acquiring a characteristic value of a characteristic particle population related to the nucleated red blood cells; and
    ascertaining a final detection result of the nucleated red blood cells according to the classifying and counting result of the nucleated red blood cells and the characteristic value of the characteristic particle population.

2. The method of claim 1, wherein the step of ascertaining a final detection result of the nucleated red blood cells according to the classifying and counting result of the nucleated red blood cells and the characteristic value of the characteristic particle population comprises:
    determining whether the classifying and counting result of the nucleated red blood cells is within a preset range;
    determining whether the characteristic value of the characteristic particle population is greater than a predetermined threshold value when the classifying and counting result of the nucleated red blood cells is within the preset range, and determining that nucleated red blood cells are present in the blood sample when the characteristic value of the characteristic particle population is greater than the predetermined threshold value; and
    ascertaining the final detection result of the nucleated red blood cells according to the classifying and counting result of the nucleated red blood cells and the determination result of whether nucleated red blood cells are present in the blood sample.

3. The method of claim 2, wherein the step of ascertaining a final detection result of the nucleated red blood cells according to the classifying and counting result of the nucleated red blood cells and the determination result comprises:
    ascertaining the classifying and counting result of the nucleated red blood cells as the final detection result of the nucleated red blood cells when the classifying and counting result of the nucleated red blood cells is consistent with the determination result; and
    ascertaining the determination result as the final detection result of the nucleated red blood cells or retesting the blood sample when the classifying and counting result of the nucleated red blood cells is inconsistent with the determination result.

4. The method of claim 3, further comprising:
    providing an alarm for indicating that the classifying and counting result of the nucleated red blood cells is false, and/or providing a prompt for the presence of interference from desultory particles when the classifying and counting result of the nucleated red blood cells is inconsistent with the determination result.

5. The method of claim 2, wherein the step of ascertaining a final detection result of the nucleated red blood cells according to the classifying and counting result of the nucleated red blood cells and the characteristic value of the characteristic particle population further comprises:
    ascertaining the classifying and counting result of the nucleated red blood cells as the final detection result of the nucleated red blood cells when the classifying and counting result of the nucleated red blood cells is outside the preset range.

6. The method of claim 1, wherein the step of acquiring a characteristic value of a characteristic particle population related to the nucleated red blood cells comprises:
    acquiring a characteristic value of a characteristic particle population related to the nucleated red blood cells from the ghost particles.

7. The method of claim 1, wherein the step of acquiring a characteristic value of a characteristic particle population related to the nucleated red blood cells comprises:
    obtaining a statistical histogram of the fluorescence signals of the ghost particles; and
    obtaining, according to the statistical histogram, a peak value that is related to the nucleated red blood cells and appears in a low fluorescence signal value region of the ghost particles, wherein the peak value is the characteristic value of the characteristic particle population.

8. The method of claim 1, wherein the step of acquiring a characteristic value of a characteristic particle population related to the nucleated red blood cells comprises:
    generating a fluorescence-scattered light scattergram based on the fluorescence signals and the scattered light signals; and counting the characteristic particle population related to the nucleated red blood cells in a low fluorescence signal value region of the ghost particles in the fluorescence-scattered light scattergram, wherein the characteristic value of the characteristic particle population is the count of the characteristic particle population or a ratio of the count of the characteristic particle population to a total number of the ghost particles.

9. The method of claim 2, wherein the method further comprises:
outputting the classifying and counting result of the nucleated red blood cells, the determination result and the final detection result of the nucleated red blood cells.

10. The method of claim 1, wherein the scattered light signals comprise at least one kind of forward-scattered light signals and side-scattered light signals, and preferably, the scattered light signals comprise the forward-scattered light signals and the side-scattered light signals.

11. A blood cell analyzer comprising:
a sampling device configured to suction a blood sample;
a pretreatment device configured to pre-treat the blood sample to obtain a pre-treated blood sample;
an optical detection device configured to allow cells in the pre-treated blood sample to pass through a detection area one by one, so as to detect fluorescence signals and scattered light signals of the cells in the blood sample; and
a processor configured to perform the following steps:
acquiring the fluorescence signals and the scattered light signals of the cells in the blood sample;
classifying and counting ghost particles, white blood cells and nucleated red blood cells in the blood sample according to the fluorescence signals and the scattered light signals;
acquiring a characteristic value of a characteristic particle population related to the nucleated red blood cells; and
ascertaining a final detection result of the nucleated red blood cells according to the classifying and counting result of the nucleated red blood cells and the characteristic value of the characteristic particle population.

12. The blood cell analyzer of claim 11, wherein the processor is configured to perform the following steps when performing the step of ascertaining a final detection result of the nucleated red blood cells according to the classifying and counting result of the nucleated red blood cells and the characteristic value of the characteristic particle population:
determining whether the classifying and counting result of the nucleated red blood cells is within a preset range;
determining whether the characteristic value of the characteristic particle population is greater than a predetermined threshold value when the classifying and counting result of the nucleated red blood cells is within the preset range, and determining that nucleated red blood cells are present in the blood sample when the characteristic value of the characteristic particle population is greater than the predetermined threshold value; and
ascertaining the final detection result of the nucleated red blood cells according to the classifying and counting result of the nucleated red blood cells and the determination result of whether nucleated red blood cells are present in the blood sample.

13. The blood cell analyzer of claim 12, wherein the processor is further configured to perform the following steps when performing the step of ascertaining a final detection result of the nucleated red blood cells according to the classifying and counting result of the nucleated red blood cells and the determination result:
ascertaining the classifying and counting result of the nucleated red blood cells as the final detection result of the nucleated red blood cells when the classifying and counting result of the nucleated red blood cells is consistent with the determination result; and
ascertaining the determination result as the final detection result of the nucleated red blood cells or retesting the blood sample when the classifying and counting result of the nucleated red blood cells is inconsistent with the determination result.

14. The blood cell analyzer of claim 13, wherein the processor is further configured to:
providing an alarm for indicating that the classifying and counting result of the nucleated red blood cells is false, and/or providing a prompt for the presence of interference from desultory particles when the classifying and counting result of the nucleated red blood cells is inconsistent with the determination result.

15. The blood cell analyzer of claim 12, wherein the processor is further configured to perform the following steps when performing the step of ascertaining a final detection result of the nucleated red blood cells according to the classifying and counting result of the nucleated red blood cells and the characteristic value of the characteristic particle population:
ascertaining the classifying and counting result of the nucleated red blood cells as the final detection result of the nucleated red blood cells when the classifying and counting result of the nucleated red blood cells is outside the preset range.

16. The blood cell analyzer of claim 11, wherein the processor is further configured to perform the following steps when performing the step of acquiring a characteristic value of a characteristic particle population related to the nucleated red blood cells:
acquiring a characteristic value of a characteristic particle population related to the nucleated red blood cells from the ghost particles.

17. The blood cell analyzer of claim 11, wherein the processor is further configured to perform the following steps when performing the step of acquiring a characteristic value of a characteristic particle population related to the nucleated red blood cells:
obtaining a statistical histogram of the fluorescence signals of the ghost particles; and
obtaining, according to the statistical histogram, a peak value that is related to the nucleated red blood cells and appears in a low fluorescence signal value region of the ghost particles, wherein the peak value is the characteristic value of the characteristic particle population.

18. The blood cell analyzer of claim 11, wherein the processor is further configured to perform the following steps when performing the step of acquiring a characteristic value of a characteristic particle population related to the nucleated red blood cells:
generating a fluorescence-scattered light scattergram based on the fluorescence signals and the scattered light signals; and
counting the characteristic particle population related to nucleated red blood cells in a low fluorescence signal value region of the ghost particles in the fluorescence-scattered light scattergram, wherein the characteristic value of the characteristic particle population is the count of the characteristic particle population or a ratio of the count of the characteristic particle population to the total number of the ghost particles.

19. The blood cell analyzer of claim 12, wherein the blood cell analyzer further comprises a display configured to display the classifying and counting result of the nucleated red blood cells, the determination result and the final detection result of the nucleated red blood cells, which are output by the processor.

20. An analysis device for a blood cell analyzer the analysis device comprising a memory, a processor, and a computer program stored in the memory and executable on the processor, wherein when the processor executes the computer program to perform a method comprising:
  acquiring fluorescence signals and scattered light signals of cells in the blood sample;
  classifying and counting ghost particles, white blood cells and nucleated red blood cells in the blood sample according to the fluorescence signals and the scattered light signals;
  acquiring a characteristic value of a characteristic particle population related to the nucleated red blood cells; and
  ascertaining a final detection result of the nucleated red blood cells according to the classifying and counting result of the nucleated red blood cells and the characteristic value of the characteristic particle population.

* * * * *